United States Patent Office 3,770,745
Patented Nov. 6, 1973

3,770,745
2-LOWER ALKYL - 2,3-DIHYDROTHIENO[3,2-c]
QUINOLINE DIOXIDES AND PHARMACEU-
TICALLY ACCEPTABLE NON-TOXIC SALTS
THEREOF
Yasuo Makisumi, Amagasaki, Japan, assignor to
Shionogi & Co., Ltd., Osaka, Japan
No Drawing. Original application Dec. 9, 1969, Ser. No.
883,613, now Patent No. 3,663,550. Divided and this
application Dec. 15, 1971, Ser. No. 208,476
Claims priority, application Japan, Dec. 25, 1968,
43/95,190; Dec. 28, 1969, 45/296, 45/297
Int. Cl. C07d 63/18
U.S. Cl. 260—283 S                5 Claims

ABSTRACT OF THE DISCLOSURE

Compounds having the formula

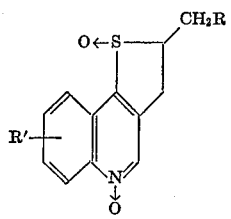

wherein R is a member selected from the group consisting of hydrogen atom and lower alkyl group containing from 1 to 5 carbon atoms and R' is a member selected from the group consisting of hydrogen atom, halogen atom, lower alkyl group containing from 1 to 5 carbon atoms and lower alkoxy group containing from 1 to 4 carbon atoms, show strong, hypothermic, analgesic and anti-inflammatory activities with low toxicities.

---

This application is a divisional application of application Ser. No. 883,613, filed on Dec. 9, 1969 and now U.S. Pat. 3,663,550.

The present invention relates to a 2-lower alkyl-2,3-dihydrothieno[3,2-c]quinoline oxide and pharmaceutically acceptable non-toxic salts thereof. It relates further to processes for their preparations.

The said 2-lower alkyl-2,3-dihydrothieno[3,2-c]quinoline oxide may be represented by the following formula:

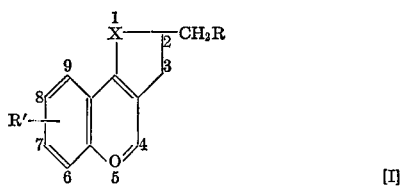

wherein R is a hydrogen atom or a lower alkyl group (e.g. methyl, ethyl, propyl, isopropyl, butyl, pentyl), R' is a hydrogen atom, a halogen atom (e.g. chlorine, bromine, iodine), a lower alkyl group (e.g. methyl, ethyl, propyl, isopropyl, butyl, pentyl) or a lower alkoxy group (e.g. methoxy, ethoxy, propoxy, butoxy), Q is a nitrogen atom or a nitroso group and X is a sulfur atom or a sulfinyl group, but Q cannot be a nitrogen atom when X is a sulfur atom.

The thieno[3,2-c]quinoline oxides of Formula I are novel and it has been discovered that they are useful as hypothermic, analgesic and anti-inflammatory agents with low toxicities.

Accordingly, a basic object of the invention is to provide novel thieno[3,2-c]quinoline oxides. Another object of the invention is to provide thieno[3,2-c]quinoline oxides and pharmaceutically acceptable non-toxic salts thereof showing strong hypothermic, analgesic and anti-inflammatory activities. A further object of the invention is to provide a process for preparing the novel thieno[3,2-c]quinoline oxides. These and other objects and the manner in which they are accomplished will become apparent to those conversant with the art from the following description of the general class of compounds and certain specific examples of particular members as well as general and specific method for their production.

The objective compounds of Formula I are 2-lower alkyl - 2,3 - dihydrothieno[3,2-c]quinoline derivatives of which the sulfur atom or/and nitrogen atom are oxidized, i.e. 2-lower alkyl-2,3-dihydrothieno[3,2 - c]quinoline 1-oxides, 2- lower alkyl-2,3-dihydrothieno[3,2-c]quinoline 5-oxides and 2-lower alkyl-2,3-dihydrothieno[3,2-c]quinoline 1,5-dioxides. The thieno[3,2-c]quinoline oxides of Formula I can be prepared by oxidizing 2-lower alkyl-2,3-dihydrothieno[3,2-c]quinolines or by treating 3-(2-halogeno-lower alkyl)-4-halogenoquinoline 1-oxides with a mercapto group introducing-agent such as thiourea or an alkali metal hydrogen sulfide. The general aspect of the present invention may be illustrated by the following scheme:

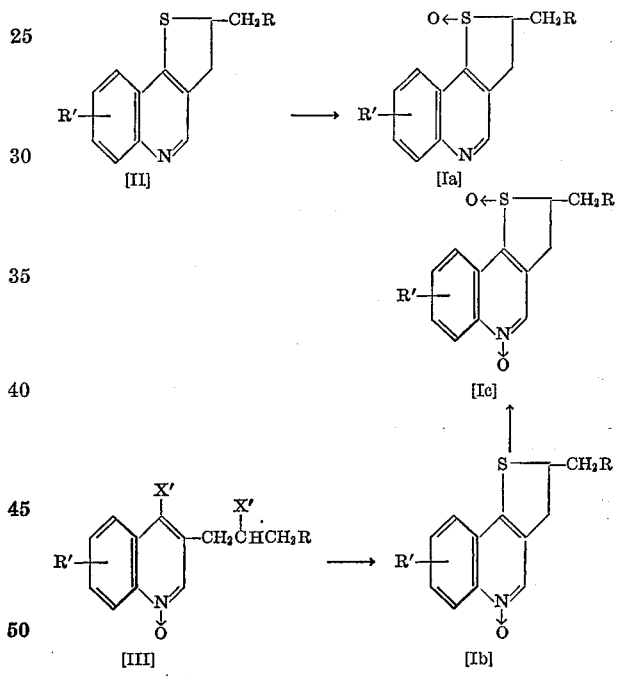

wherein X' is a halogen atom (e.g. chlorine, bromine, iodine) and R and R' each has the same significance as designated above.

As illustrative of the objective compounds of Formula I that are 1,5-dioxides are the compounds 2-methyl-2,3-dihydrothieno[3,2-c]quinoline 1,5-dioxide,
2-ethyl-2,3-dihydrothieno[3,2-c]quinoline 1,5-dioxide,
2-propyl-2,3-dihydrothieno[3,2-c]quinoline 1,5-dioxide,
2-butyl-2,3-dihydrothieno[3,2-c]quinoline 1,5-dioxide,
2-methyl-7-chloro-2,3-dihydrothieno[3,2-c]quinoline
 1,5-dioxide,
2-methyl-8-chloro-2,3-dihydrothieno[3,2-c]quinoline
 1,5-dioxide,
2-methyl-7-bromo-2,3-dihydrothieno[3,2-c]quinoline 1,
 5-dioxide,
2-methyl-8-iodo-2,3-dihydrothieno[3,2-c]quinoline 1,5-
 dioxide,
2-propyl-7-bromo-2,3-dihydrothieno[3,2-c]quinoline 1,5-
 dioxide, 2,8-dimethyl-2,3-dihydrothieno[3,2-c]quinoline 1,5-dioxide,
2-methyl-7-ethyl-2,3-dihydrothieno[3,2-c]quinoline 1,5-dioxide,
2-butyl-8-methyl-2,3-dihydrothieno[3,2-c]quinoline 1,5-dioxide,
2-methyl-7-methoxy-2,3-dihydrothieno[3,2-c]quinoline 1,5-dioxide,
2-methyl-8-methoxy-2,3-dihydrothieno[3,2-c]quinoline 1,5-dioxide,
2-ethyl-8-methoxy-2,3-dihydrothieno[3,2-c]quinoline 1,5-dioxide,
2-methyl-7-propoxy-2,3-dihydrothieno[3,2-c]quinoline 1,5-dioxide
and the like.

According to the present invention, the objective thieno[3,2-c]quinoline oxide of Formula I can be prepared from a thieno[3,2-c]quinoline of Formula II or a 3-(2-halogeno-lower alkyl)-4-halogenoquinoline 1-oxide of Formula III, which is illustrated in detail below, respectively.

(1) Preparation of 2-lower alkyl-2,3-dihydrothieno[3,2-c]quinoline 1-oxide [Ia]

One of the objective compounds, 2-lower alkyl-2,3-dihydrothieno[3,2-c]quinoline 1-oxide [Ia] can be obtained by oxidizing 2-lower alkyl-2,3-dihydrothieno[3,2-c]quinoline [II]. The oxidizing agent employed in the reaction may be selected from those used for oxidizing a sulfide to a sulfoxide, such as hydrogen peroxide, an organic peracid (e.g. performic acid, peracetic acid, perbenzoic acid, 3-chloroperbenzoic acid, monoperphthalic acid), periodic acid, a periodate (e.g. sodium periodate, potassium periodate), persulfuric acid, a persulfate (e.g. ammonium persulfate, potassium persulfate), chromic acid, chromic anhydride, a chromate (e.g. sodium bichromate, potassium bichromate), nitric acid, a hypohalogenous acid (e.g. hypochloric acid, hypobromic acid, hypoiodic acid), a hypohalite (e.g. sodium hypochlorite, sodium hypobromite, sodium hypoiodite), a halogen (e.g. chlorine, bromine, iodine), selenium dioxide, ruthenium tetraoxide, manganese dioxide, lead tetracetate and the like. The oxidation reaction can be carried out at a temperature ranging from about 0 to about 150° C., but if necessary, the reaction mixture may be cooled when the oxidizing agent is added. As illustrative of the reaction solvents are water, a lower alkanol (e.g. methanol, ethanol, propanol), dioxane, tetrahydrofuran, ether, benzene, chloroform, dichloromethane, acetic acid and the like, and a suitable mixture thereof may be also employed.

The products obtainable in the present oxidation reaction and the ratios thereof depend upon the oxidizing agent employed and the reaction conditions under which the reaction is carried out. In the case the reaction is carried out by using an equimolar amount of an organic peracid to the starting compound gives thieno[3,2-c]quinoline 1-oxide [Ia] as a main product. The thus produced thieno[3,2-c]quinoline 1-oxide [Ia] can be, however, further oxidized to thieno[3,2-c]quinoline 1,1-dioxide or/and thieno[3,2-c]quinoline 1,1,5-trioxide in the presence of the excess organic peracid. There is also produced thieno[3,2-c]quinoline 1,5-dioxide [Ic], but it is only a small amount, since a sulfur atom might be more easily oxidized than a nitrogen atom. Accordingly, for the purpose of the present invention, an equimolar amount of the peracid is to be used. When chromic anhydride, nitric acid or a hypohalite is employed as an oxidizing agent, there is obtained thieno[3,2-c]quinoline 1-oxide [Ia] under a mild condition. The oxidation reaction with a periodate, selenium dioxide, manganese dioxide or lead tetracetate is characterized in giving selectively thieno[3,2-c]quinoline 1-oxide [Ia].

The starting compound, thieno[3,2-c]quinoline [II] can be prepared according to the method described in Belgian patent specification No. 694,239. Examples of the starting compound are 2-methyl-2,3-dihydrothieno[3,2-c]quinoline,
2-ethyl-2,3-dihydrothieno[3,2-c]quinoline,
2-propyl-2,3-dihydrothieno[3,2-c]quinoline,
2-butyl-2,3-dihydrothieno[3,2-c]quinoline,
2-methyl-7-chloro-2,3-dihydrothieno[3,2-c]quinoline,
2-methyl-8-chloro-2,3-dihydrothieno[3,2-c]quinoline,
2-methyl-7-bromo-2,3-dihydrothieno[3,2-c]quinoline,
2-methyl-8-iodo-2,3-dihydrothieno[3,2-c]quinoline,
2-propyl-7-bromo-2,3-dihydrothieno[3,2-c]quinoline,
2,8-dimethyl-2,3-dihydrothieno[3,2-c]quinoline,
2-methyl-7-ethyl-2,3-dihydrothieno[3,2-c]quinoline,
2-butyl-8-methyl-2,3-dihydrothieno[3,2-c]quinoline,
2-methyl-7-methoxy-2,3-dihydrothieno[3,2-c]quinoline,
2-methyl-8-methoxy-2,3-dihydrothieno[3,2-c]quinoline,
2-ethyl-8-methoxy-2,3-dihydrothieno[3,2-c]quinoline,
2-methyl-7-propoxy-2,3-dihydrothieno[3,2-c]quinoline
and the like.

(2) Preparation of 2-lower alkyl-2,3-dihydrothieno[3,2-c]quinoline 5-oxide [Ib]

Another objective compound, 2-lower alkyl-2,3-dihydrothieno[3,2-c]quinoline 5-oxide [Ib] can be obtained by treating 3-(2-halogeno-lower alkyl)-4-halogenoquinoline 1-oxide [II] with a mercapto group-introducing agent such as thiourea or an alkali metal hydrogen sulfide (e.g. sodium hydrogen sulfide, potassium hydrogen sulfide). The reaction is carried out in an inert solvent at a temperature ranging from about 30 to about 300° C. As illustrative of the reaction solvent are water, methanol, ethanol, propanol, butanol, ethylene glycol, propylene glycol and the like.

The starting compound, 3-(2-halogeno-lower alkyl)-4-halogenoquinoline 1-oxide [II] can be prepared, for instance, by oxidizing a known 3-(2-halogeno-lower alkyl)-4-halogenoquinoline (Andersag et al., U.S. Pat. No. 2,650,226) with an organic peracid. Examples of the starting compound are 3-(2-chloropropyl)-4-chloroquinoline 1-oxide,
3-(2-bromopropyl)-4-bromoquinoline 1-oxide,
3-(2-chlorobutyl)-4-chloroquinoline 1-oxide,
3-(2-chloropentyl)-4-chloroquinoline 1-oxide,
3-(2-chlorohexyl)-4-chloroquinoline 1-oxide,
3-(2-bromoheptyl)-4-bromoquinoline 1-oxide,
3-(2-chloropropyl)-4,6-dichloroquinoline 1-oxide,
3-(2-chloropropyl)-4,7-dichloroquinoline 1-oxide,
3-(2-bromopropyl)-4-bromo-7-chloroquinoline 1-oxide,
3-(2-iodopropyl)-4,6-diiodoquinoline 1-oxide,
3-(2-chlorobutyl)-4,7-dichloroquinoline 1-oxide,
3-(2-chloropropyl)-4-chloro-6-methylquinoline 1-oxide,
3-(2-bromopropyl)-4-bromo-7-ethylquinoline 1-oxide,
3-(2-chlorohexyl)-4-chloro-6-methylquinoline 1-oxide,
3-(2-chloropropyl)-4-chloro-7-methoxyquinoline 1-oxide,
3-(2-iodopropyl)-4-iodo-6-methoxyquinoline 1-oxide,
3-(2-bromobutyl)-4-6-methoxyquinoline 1-oxide,
3-(2-chloropropyl)-4-chloro-7-ethoxyquinoline 1-oxide,
3-(2-chloropropyl)-4-chloro-6-propoxyquinoline 1-oxide
and the like.

(3) Preparation of 2-lower alkyl-2,3-dihydrothieno[3,2-c]quinoline 1,5-dioxide [Ic]

2-lower alkyl-2,3-dihydrothieno[3,2-c]quinoline 5-oxide [Ib] obtained according to the above procedure (2) can be converted to the other objective compound, 2-lower alkyl-2,3-dihydrothieno[3,2-c]quinoline 1,5-dioxide [Ic] by an oxidation. The oxidation reaction may be carried out substantially in a similar manner as described in the procedure (1). As an oxidazing agent, there may be exemplified as follows: hydrogen peroxide, an organic peracid (e.g. performic acid, peracetic acid, perbenzoic acid, 3-chloroperbenzoic acid, monoperphthalic acid), periodic acid, a periodate (e.g. sodium periodate, potassium periodate), persulfuric acid, a persulfate (e.g. ammonium persulfate, potassium persulfate), chromic acid, chromic anhydride, a chromate (e.g. sodium bichromate, potassium bichromate), nitric acid, a hypohalogenous acid (e.g. hypochloric acid, hypobromic acid, hypoiodic acid), a hypohalorite (e.g. sodium hypochlorite, sodium hypobromite, sodium hypoiodite), a halogen (e.g. chlorine, bromine, iodine), selenium dioxide, ruthenium tetraoxide, manganese dioxide, lead tetraacetate and the like. The treatment of the compound [Ib] with such an oxidizing agent can be carried out at a temperature ranging from about 0 to about 150° C. in a suitable solvent such as water, a lower alkanol (e.g. methanol, ethanol, propanol), dioxane, tetrahydrofuran, ether, benzene, chloroform, dichloromethane, acetic acid and the like, and a mixture thereof.

As mentioned in the above procedure (1), the thus produced thieno[3,2-c]quinoline, 1,5-dioxide [Ic] is further oxidized to thieno[3,2-c]quinoline, 1,1,5-trioxide according to the oxidizing agent employed and the reaction conditions under which the reaction is carried out. Therefore, in the case of using an organic peracid as the oxidizing agent, an equimolar amount of the peracid is properly to give thieno[3,2-c]quinoline 1,5-dioxide [Ic] with good yield. The oxidation reaction with chromic anhydride, nitric acid or a hydrohalorite is carried out under a mild condition to avoid the production of thieno[3,2-c]quinoline 1,15-trioxide. It is preferred to use the oxidizing agents such as a periodate, selenium dioxide, manganese dioxide, lead tetracetate and the like, which are characterized in giving selectively thieno[3,2-c]quinoline 1,5-dioxide [Ic].

Since the thus produced 2-lower alkyl 2,3-dihydrothieno[3,2-c]quinoline oxide [I] is usually a liquid or solid substance which might have a comparatively low melting point, it may be converted, if necessary, into its acid addition salt, for instance, by treating the former with an acid such as hydrochloric, hydrobromic, hydroiodic, sulfuric, nitric, phosphoric, thiocyanic, carbonic, acetic, propionic, oxalic, citric, tartaric, succinic, salicylic, benzoic or palmitic acid in a suitable solvent such as water, methanol, benzene and toluene. There are the thus produced hydrochloride, hydrobromide, hydroiodide, sulfate, nitrate, phosphate, thiocyanate, carbonate, acetate, propionate, oxalate, citrate, tartrate, succinate, salicylate, benzoate, palmitate and the like.

The 2 - lower alkyl-2,3-dihydrothieno[3,2-c]quinoline oxide [I] and its non-toxic salt are useful as hypothermic, analgesic and anti-inflammatory agents. For example, the animal test data of some typical products of the invention are shown in the following table, in contrast with a commercially available and frequently used agent, i.e. aminopyrine.

able non-steroidal anti-inflammatory agent. For example, when the inhibition activity against the edema caused by a phlogistic agent, carrageenin, is examined in rats by oral administration of a dose of 100 mg./kg. of the test compound, 2 - methyl-2,3-dihydrothieno[3,2-c]quinoline 5-oxide hydrochloride, 2 - methyl-8-chloro-2,3-dihydrothieno[3,2-c]quinoline 5-oxide hydrochloride, 2-methyl-8-chloro-2,3-dihydrothieno[3,2-c]quinoline 1,5 - dioxide, 2,8-dimethyl - 2,3 - dihydrothieno[3,2-c]quinoline 1-oxide and aminopyrine show 40.5%, 41.8%, 46.4%, 42.9% and 43.3% inhibitions, respectively.

The other 2-lower alkyl-2,3-dihydrothieno[3,2-c]quinoline oxides and non-toxic acid addition salts thereof provided by the present invention also show similarly excellent pharmacological properties. Accordingly, the compounds of Formula I and pharmaceutically acceptable non-toxic salt thereof are useful as hypothermic, analgesic and anti-inflammatory agents of a low toxicity, which can be administered in dosage unit form, as carried by a suitable pharmaceutical carrier, to human beings particularly for relieving fever, pain and/or inflammation. Administration is advantageously effected orally in the form of conventionally prepared tablets or the like. Each tablet, or other per se conventional administration form, may contain e.g. 50 to 200 milligrams of active compound according to the invention and medication is continued at intervals prescribed e.g. by the attending physician until relief is attained.

The following examples illustrate methods of carrying out the present invention, but it is to be understood that these examples are given for the purpose of illustration only and not of limitation.

In the examples which follow, parts by weight bear the same relation to parts by volume as do grams to millilitres. Temperatures are set forth in degree centigrade. The abbreviations have conventional significances.

Example 1

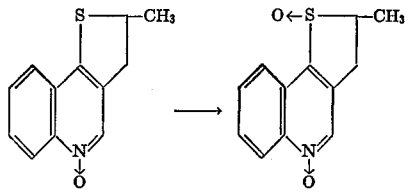

To a solution of 2-methyl-2,3-dihydrothieno[3,2-c] quinoline 5-oxide (4.34 parts by weight) in methanol (200 parts by volume) is added another solution of sodium periodate (4.71 parts by weight) in water (100 parts by volume) while stirring and ice cooling. The resulting mixture is stirred at a room temperature for 1 hour and

TABLE

Pharmacological properties of some typical 2-lower alkyl-2,3-dihydrothieno[3,2-c]quinoline oxides determined orally

| Pharmacological property | Toxicity [1], LD$_{50}$ mg./kg. | Analgesic [2] activity, ED$_{50}$ mg./kg. | Hypothermic [3] activity, ° C. |
|---|---|---|---|
| Test compound: | | | |
| 2-methyl-2,3-dihydrothieno[3,2-c]quinoline 5-oxide hydrochloride | 650 | 80 | −5.22 |
| 2-methyl-2,3-dihydrothieno[3,2-c]quinoline 1,5-dioxide hydrochloride | 700 | 40 | −6.09 |
| 2-methyl-8-chloro-2,3-dihydrothieno[3,2-c]-quinoline 1-oxide | 700 | 100 | −6.04 |
| 2-methyl-8-chloro-2,3-dihydrothieno[3,2-c]-quinoline 5-oxide hydrochloride | 800 | 200 | −5.36 |
| 2,8-dimethyl-2,3-dihydrodihydrothieno[3,2-c]-quinoline 1-oxide | 650 | 200 | −4.98 |
| Aminopyrine | 780 | 673 | −2.99 |

[1] Toxicity is determined in mice by oral administration.
[2] Analgesic activity is determined orally in rats by supression of foot licking caused by formalin.
[3] Hypothermic activity is presented by depression of the bodily temperature in mice, when treated orally with a dose of 250 mg./kg. of the test compound.

From the test data listed in the table, it is apparent that the five typical products of the invention show remarkably stronger analgesic and hypothermic activities than aminopyrine. Further, the toxicities of those compounds of the invention are as low as that of aminopyrine.

Furthermore, the compounds of the present invention show a marked anti-inflammatory activity, which is as strong as that of phenylbutazone, a commercially availallowed to stand overnight. After removal of the precipitated sodium iodate by filtration, the filtrate is concentrated under reduced pressure. The residue is extracted with chloroform and the extract is washed with water, dried over anhydrous magnesium sulfate and evaporated. Recrystallization from benzene gives 2-methyl-2,3-dihydrothieno[3,2-c]quinoline 1,5-dioxide (3.68 parts by weight) as colorless prisms melting at 148 to 150° C.

*Analysis.*—Calcd. for $C_{12}H_{11}NO_2S$ (percent): C, 61.77; H, 4.75; N, 6.00. Found (percent): C, 62.02; H, 4.67; N, 6.04.

Example 2

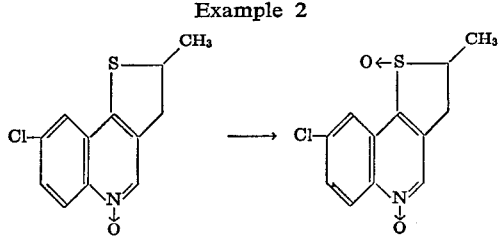

To a solution of 2-methyl-8-chloro-2,3-dihydrothieno[3,2-c]quinoline 5-oxide (5 parts by weight) in methanol (200 parts by volume) is added dropwise another solution of sodium periodate (4.686 parts by weight) in water (100 parts by volume) while stirring and ice cooling. Working up in a similar manner to Example 1, there is obtained 2-methyl-8-chloro-2,3-dihydrothieno[3,2-c]quinoline 1,5-dioxide (4.91 parts by weight) as colorless pillars melting at 178° C., when recrystallized from benzene.

*Analysis.*—Calcd. for $C_{12}H_{10}NO_2SCl$ (percent): C, 53.83; H, 3.76; N, 5.23; S, 11.97. Found (percent): C, 53.67; H, 3.82; N, 5.20; S, 11.98.

Example 3

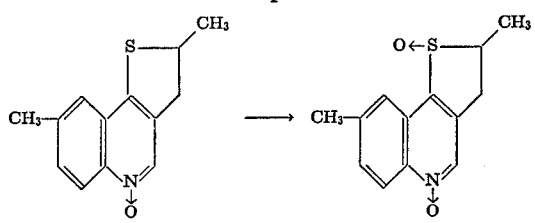

To a solution of 2,8-dimethyl-2,3-dihydrothieno[3,2-c]quinoline 5-oxide (3 parts by weight) in methanol (100 parts by volume) is added dropwise another solution of sodium periodate (3.1 parts by weight) in water (50 parts by volume) while stirring and ice cooling. Working up in a similar manner to Example 1, there is obtained 2,8-dimethyl-2,3-dihydrothieno[3,2-c]quinoline 1,5-dioxide (3.03 parts by weight) as colorless pillars melting at 154.5 to 156.5° C., when recrystallized from benzene petroleum ether.

*Analysis.*—Calcd. for $C_{13}H_{13}NO_2S$ (percent): C, 63.14; H, 5.30; N, 5.66. Found (percent): C, 63.21; H, 5.27; N, 5.57.

Example 4

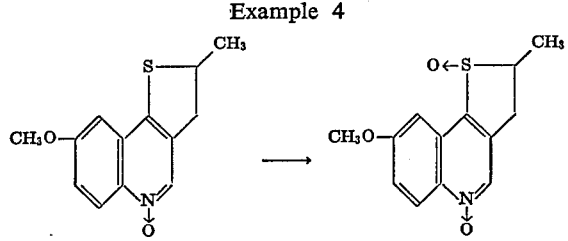

To a solution of 2-methyl-8-methoxy-2,3-dihydrothieno[3,2-c]quinoline 5-oxide (3 parts by weight) in methanol (90 parts by volume) is added dropwise another solution of sodium periodate (2.87 parts by weight) in water (50 parts by volume) while stirring and ice cooling. Working up in a similar manner to Example 1, there is obtained 2-methyl-8-methoxy-2,3-dihydrothieno[3,2-c]quinoline 1,5-dioxide (2.98 parts by weight) as colorless pillars melting at 161 to 162° C., when recrystallized from benzene.

*Analysis.*—Calcd. for $C_{13}H_{13}NO_3S$ (percent): C, 59.30; H, 4.98; N, 5.32. Found (percent): C, 59.10; H, 4.99; N, 5.03.

What is claimed is:

1. A member selected from the group consisting of the compounds of the formula

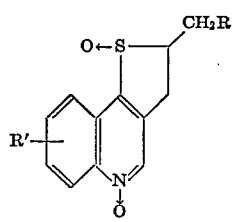

wherein R is a member selected from the group consisting of hydrogen atom and lower alkyl group containing from 1 to 5 carbon atoms and R' is a member selected from the group consisting of hydrogen atom, halogen atom, lower alkyl group containing from 1 to 5 carbon atoms and lower alkoxy group containing from 1 to 4 carbon atoms.

2. The compound according to claim 1, namely 2-methyl-2,3-dihydrothieno[3,2-c]quinoline 1,5-dioxide.

3. A compound according to claim 1, namely 2-methyl-8-chloro-2,3-dihydrothieno[3,2-c]quinoline 1,5-dioxide.

4. A compound according to claim 1, namely 2,8-dimethyl-2,3-dihydrothieno[3,2-c]quinoline 1,5-dioxide.

5. A compound according to claim 1, namely 2-methyl-8-methoxy-2,3-dihydrothieno[3,2-c]quinoline 1,5-dioxide.

References Cited

UNITED STATES PATENTS

| | | | |
|---|---|---|---|
| 2,650,226 | 8/1953 | Andersag et al. | 260—288 X |
| 2,650,227 | 8/1953 | Timmler et al. | 260—288 R |

OTHER REFERENCES

Kobaryashi et al.: Chem. Abstr., vol. 59, col. 5144d (1963).

Makisumi: Chem. Abstr., vol. 66, col. 94897k (1967).

DONALD G. DAUS, Primary Examiner